Nov. 7, 1939.　　R. R. TURNER ET AL　　2,179,389
COILING APPARATUS
Filed June 24, 1938　　3 Sheets-Sheet 1

INVENTOR.
Ralph R. Turner
Francis W. Sullivan
BY
Barlow & Barlow
ATTORNEYS.

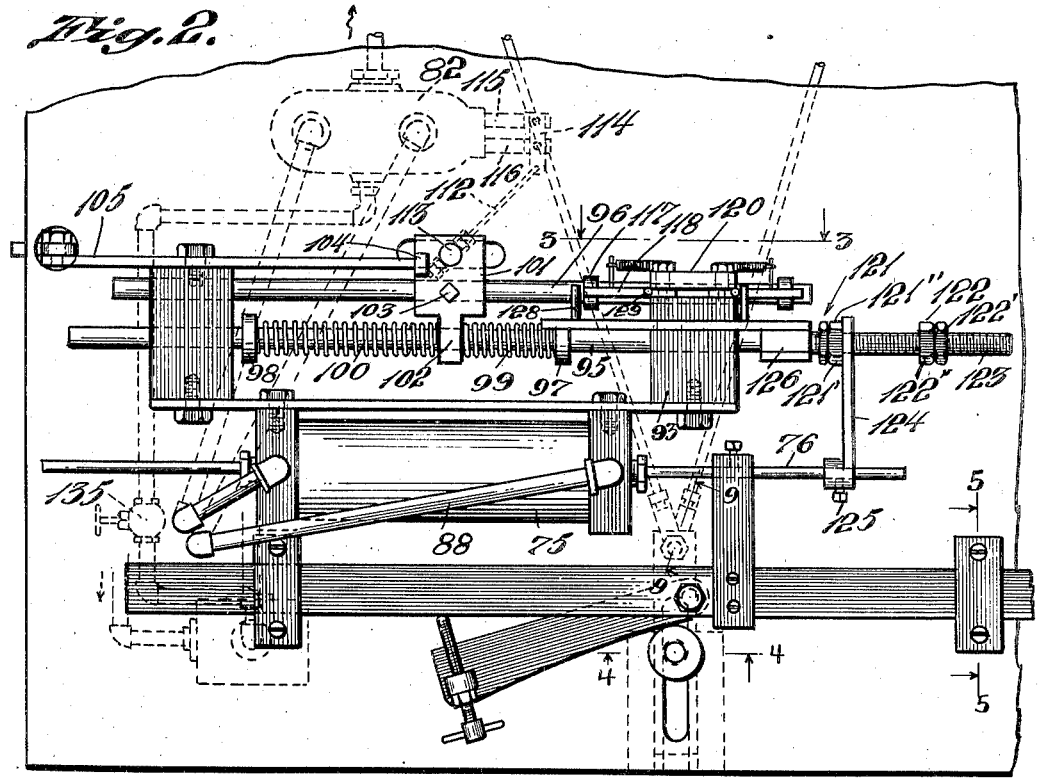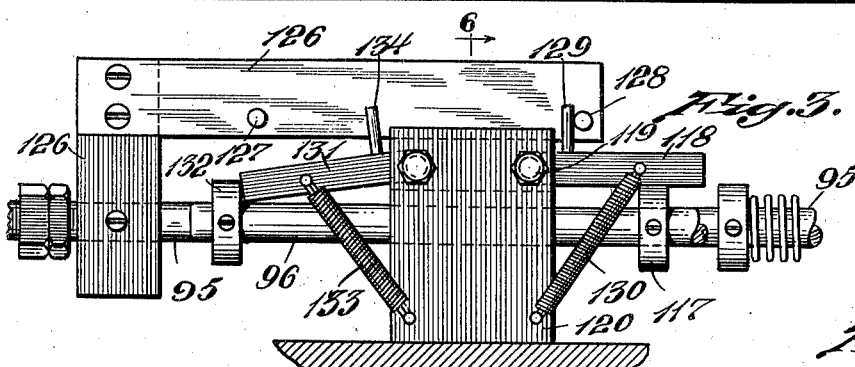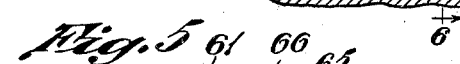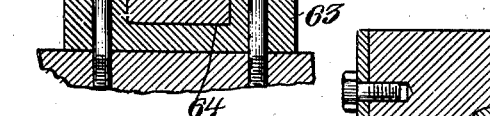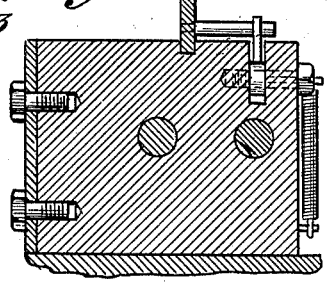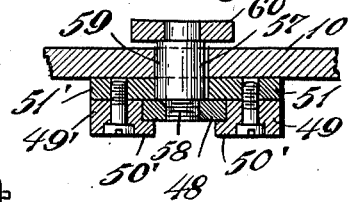

Nov. 7, 1939.       R. R. TURNER ET AL       2,179,389
COILING APPARATUS
Filed June 24, 1938       3 Sheets-Sheet 3
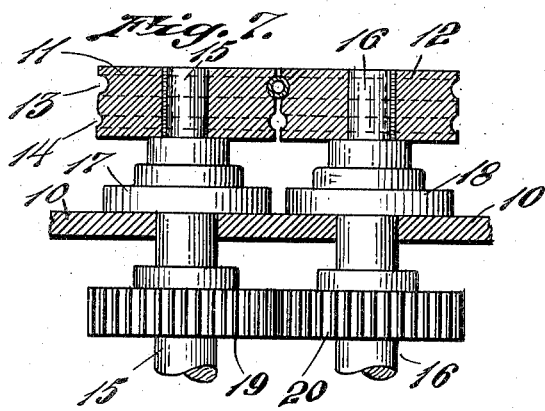
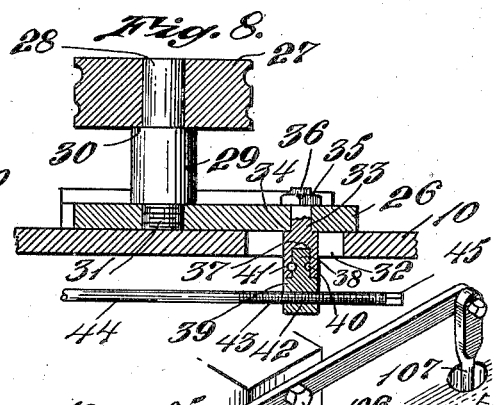
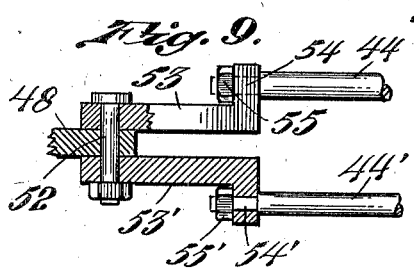
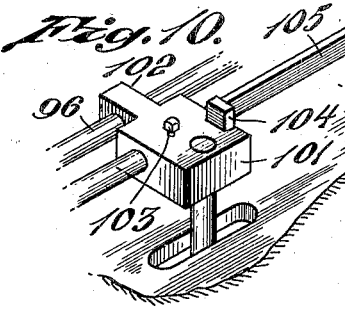
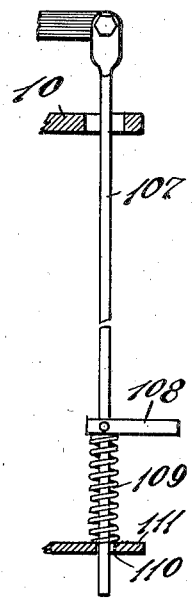
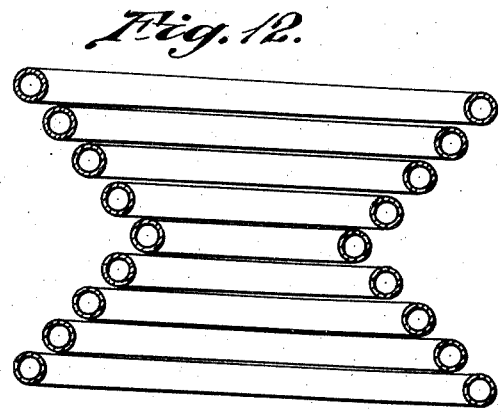
INVENTOR.
Ralph R. Turner
Francis W. Sullivan
BY
Barlow & Barlow
ATTORNEYS.

Patented Nov. 7, 1939

2,179,389

UNITED STATES PATENT OFFICE 2,179,389

COILING APPARATUS

Ralph R. Turner, Warwick, and Francis W. Sullivan, Cranston, R. I., assignors to United Wire & Supply Corporation, a corporation of Rhode Island Application June 24, 1938, Serial No. 215,600

16 Claims. (Cl. 153—64)

This invention relates to an apparatus for coiling lengths of wire or tubing, particularly in the form of a coil which is the subject matter of an application, Serial No. 191,428, filed by Francis W. Sullivan, one of the joint inventors of this invention. An object of this invention is to provide an apparatus which will be automatic after its operation is commenced to provide an accurate and well-formed coil of tubing or wire in a certain desired shape.

Another object of the invention is to provide an apparatus wherein there are adjustments to enable the apparatus to coil tubing or wire of varying diameters.

Another object of the invention is to provide an automatic machine which when tripped will perform one predetermined cycle of operations and then stop for manual manipulation.

Another object of the invention is to provide for a simple means of performing a single cycle of operations and then stopping.

Another object of the invention is to provide a hydraulic means wherein the same operates a bending roll and wherein the speed of operation of the bending roll with reference to the feed may be so nicely controlled that the coil of a desired shape or one which may be accommodated to wires and tubes of varying thicknesses may be had.

With these and other objects in view, the invention consists of certain novel features of construction, as will be more fully described, and particularly pointed out in the appended claims.

In the accompanying drawings:

Fig. 2 is a view similar to Fig. 1 but showing the operating part of the apparatus on a larger scale and in a somewhat different position that by comparison the relatively moving parts may be seen;

Figure 1:
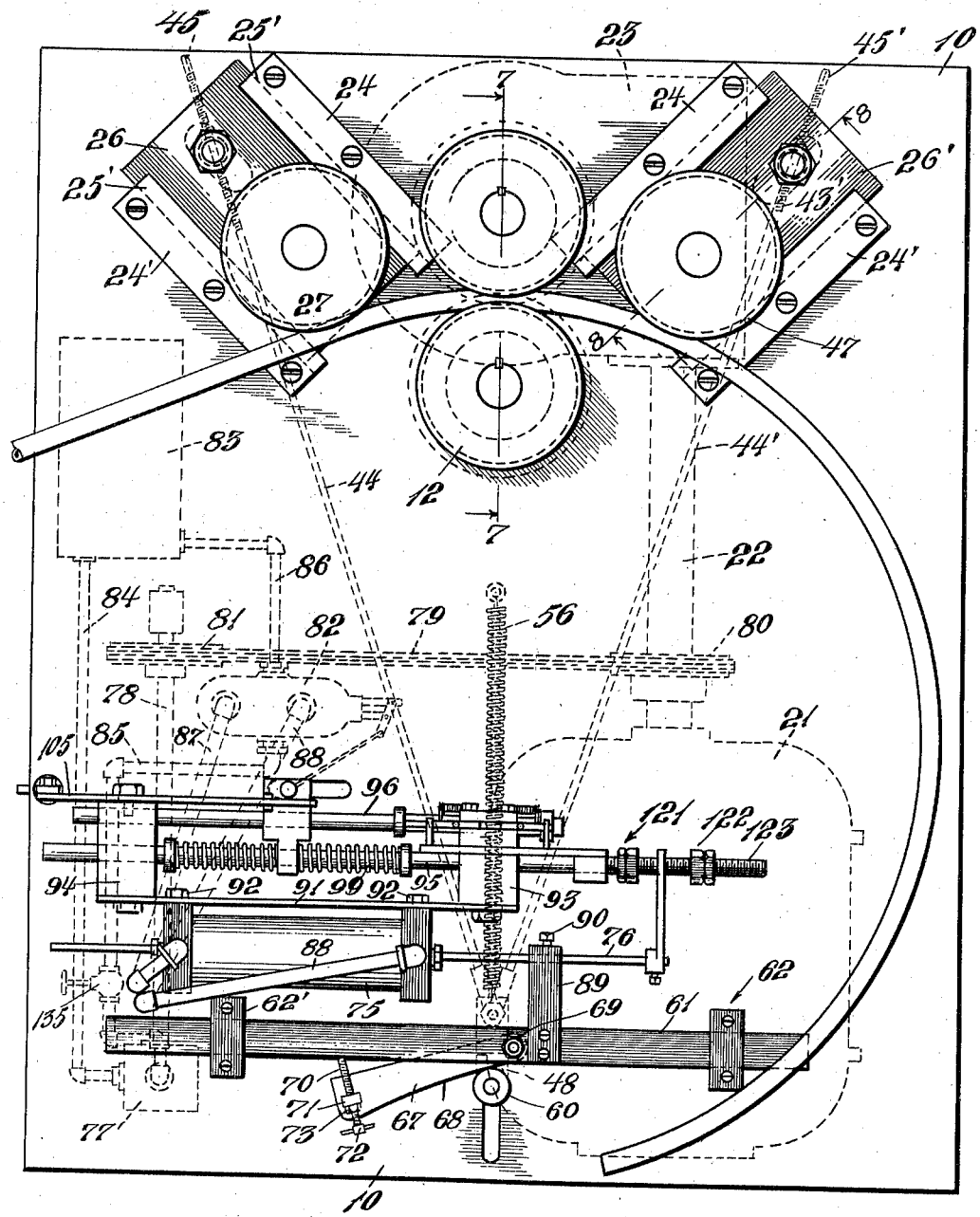
Fig. 1 is a top plan view of the machine showing apparatus which we utilize for performing this invention.

Fig. 3 is a sectional view on line 3—3 of Fig. 2;
Fig. 4 is a sectional view on line 4—4 of Fig. 2;
Fig. 5 is a sectional view on line 5—5 of Fig. 2;
Fig. 6 is a sectional view on line 6—6 of Fig. 3;
Fig. 7 is a sectional view on line 7—7 of Fig. 1;
Fig. 8 is a sectional view on line 8—8 of Fig. 1;
Fig. 9 is a sectional view on line 9—9 of Fig. 2;
Fig. 10 is a perspective view looking at the trip lever and showing fragmentally parts of the machine associated therewith;

Fig. 11 is an elevation of the rod and foot treadle for tripping the actuating mechanism of the machine;

Fig. 12 is a sectional view of the work coiled.

In the usual coiling of wire or tubing a helical coil is made in which each of the convolutions are of the same size and lie upon the next convolution. Such coils take up a great deal of space, and in order to provide a coil in somewhat of an hour-glass shape with mechanism for bending the tubing, we have provided a machine which will be automatic in that the tubing will be caused to be coiled smaller and smaller until a certain diameter is provided, and then larger and larger until the original diameter is provided, when the same will stop, thus allowing for severing the tubing and the commencing of another similar coil, or the cycle may be added to either automatically or by manual manipulation of some trigger arrangement until a desired build-up of coil is had; and the following is a more detailed description of the present embodiment of this invention, illustrating the preferred means by which these advantageous results may be accomplished:

With reference to the drawings, we have illustrated in Fig. 1 a table 10 which is suitably supported above the floor at a height of perhaps two feet or a little over on some suitable legs or pedestal mounting. The apparatus which is shown in full lines is on the top of this table 10 while the apparatus shown in dotted lines is beneath the table. There are a pair of feeding rolls 11 and 12 which are grooved as at 13 and 14 (see Fig. 7). The grooves 13 are larger than the grooves 14 so as to accommodate work of a different diameter by turning the rolls end for end upon their shafts 15 and 16. These rolls are keyed to these shafts 15 and 16 and these shafts have a suitable bearing 17 and 18 mounted upon the table top 10 and in which they rotate. The shaft 15 has a spur gear 19 thereon which meshes with the spur gear 20 on the shaft 16 so that the two shafts will operate in unison.

An electric motor 21 (see Fig. 1) mounted beneath the table 10 has a drive shaft 22 extending therefrom into a reducing gear casing 23 for operating a worm and in turn a worm gear which, through suitable reduction drives the shaft 15 upon which the roll 11 is mounted.

There are a pair of slideways 24, 24' which have overhanging flanges 25, 25' beneath which the slide or carriage 26 or 26' is movably mounted. One carriage 26 has bending roll 27 rotatably mounted upon the reduced portion 28 (see Fig. 8) of the stud 29 and resting upon the shoulder 30 thereof. This stud 29 is threaded into the carriage as at 31. Depending from the carriage 26 through slot 32 in the table 10 there is a stud 33 which has a reduced portion extending through the carriage and forming a shoulder 34 to abut the lower part of the carriage, this shoulder being held snugly against the carriage by a nut 35 having threaded engagement with the end 36. Stud 33 is provided with a recess 37 which receives the reduced end 38 of a member 39 which is grooved as at 40, while a pin 41 locks the same in the recess but still permits of a swivelling of the member 39 in position. Member 39 has a threaded bore 42 which engages the threaded portion 43 of the link 44, the link 44 having a squared end 45 which may be rotated for adjustment of the effective length of the link in its connection with slide and the roll 27 carried thereby.

This bending roll which has just been described is on one side of the feed rolls 11 and 12, namely, the entering side of the work to be coiled. Upon the opposite side of the feed rolls 11 and 12 we have provided a guide roll 47 which so far as mounting occurs is substantially a duplicate of the bending roll 27. This guide roll 47 is mounted upon a carriage 26' in slideways 24, 24' while there is depending from the slide or carriage a similar stud 33 which is connected to a link which we will designate as 44' having threads 43' and a squared end 45' for adjustment separate and independent from the bending roll 27. These rolls are adjusted with relation to the diameter of the work being manipulated and with reference to the temper and re-coil of the tubing or wire which is being worked upon.

The links 44 and 44' are connected to a bar 48 (see Figs. 1 and 4) which is slidably mounted in the gibs 49, 49' and between the flange portions 50, 50' thereof and the spacing elements 51, 51' between these portions and the table 10, this connection being by means of a pin 52 (see Fig. 9) extending through the bar 48 and through L-shaped members 53, 53' which are connected to the links 44 and 44' by the reduced portions 54, 54' and nuts 55 and 55' having threaded engagement with their ends. Thus, as the bar 48 moves outwardly of the table 10 the links will draw the bending roll 27 and guide roll 47 with them to reduce the radius of the arc on which the tubing is bent. A spring 56 (see Fig. 1) moves the bar 48 in the opposite direction and thus will carry the bending roll 27 and guide roll 47 outwardly to cause a larger radius arc to be formed in the work which is fed into the machine. Bar 48 has a stud 57 (see Fig. 4) threadingly engaging the same as at 58 which stud extends through a slot 59 in the table and upon the upper end of this stud a cam follower roll 60 is rotatably mounted.

A bar 61 is slidably mounted on the table 10 in a strap guide 62 consisting of a block 63 (see Fig. 5) with a recess 64 therein for receiving the bar 61 which is held in such recess by a cap member 65 bolted through the block and into the table as at 66. Two of such blocks 62 and 62' guide the bar in its reciprocating movement. A cam 67 having a cam surface 68 for engagement with the cam follower 60 is pivotally mounted as at 69 upon the bar 61 and is adjusted in relation to said bar by the threaded member 70 extending through the eye 71 and operated by handle 72 and clamped in position by the check nut 73. As this bar is moved toward the right in Figs. 1 and 2 the cam engages the follower 60 causing the cam follower to be moved to cause the rolls 27 and 47 to be drawn inwardly against the tension of spring 56, while when the bar is moved in the opposite direction the cam will permit the follower to move in the reverse direction under action of spring 56.

To move the bar 61 to the left we have provided a cylinder 75 which has a piston therein with a piston rod 76 extending from the cylinder. This piston is a double acting hydraulic type whereby when liquid is forced into the cylinder on one side of the piston it is moved in one direction and when forced into the cylinder on the other side the piston is moved in the opposite direction. An oil pump 77 is driven by means of shaft 78 from the motor shaft 22 by a suitable sprocket chain 79 engaging sprocket gears 80 on shaft 22, and 81 on shaft 78 for continually driving the pump. The supply of the pumped oil is controlled by a valve 82. The pump draws oil from the supply reservoir 83 which is transmitted to the pump by the pipe 84 and is then transmitted from the pump to a central portion of the valve by the pipes 85. This valve 82 is so arranged that when in neutral position the oil pumped through the pipe 85 will by-pass or be delivered back to the reservoir 83 through the pipe 86. However, when the valve is moved to one position the oil will be delivered through the pipe 87 to the left-hand end of the cylinder 75 to force the piston and piston rod to the right, while when the valve is in another position the oil will be forced through the pipe 88 to the opposite end of the cylinder 75 to force the piston and piston rod 76 in the opposite direction.

It will be understood that the piston rod 76 is connected to the bar 61 by a member 89 which may be adjusted on the rod 76 by the set screw 90.

A frame 91 (see Fig. 1) above the table and adjacent the cylinder 75 is held in position by means of the bolts 92. This frame 91 supports a control mechanism for the valve 82. The supports for this control mechanism consist of blocks 93 and 94 in which there are slidably mounted a pair of rods 95 and 96. A pair of abutment members 97 and 98 (see Fig. 2) are fixedly mounted on the rod 95 the first of which engages spring 99 which loosely encircles the rod 95 while the abutment 98 engages spring 100 also loosely encircling the rod 95. A block-like member 101 has an arm 102 to extend between the springs 99 and 100 to form an abutment for the other end of the springs and embraces but is slidable with relation to the rod 95. This block 101 is fixed upon the rod 96 so as to move therewith but may be adjusted with relation thereto by the set screw 103. This block 101 carries an abutment finger 104 against which one end of a lever 105 (see also Fig. 10) pivoted as at 106 may engage. A link 107 is connected to the lever on the opposite side of the pivot, which link extends down through the table 10 and has a treadle 108 thereon (see Fig. 11) which is urged upwardly by a spring 109, the link 107 being guided by an opening 110 in a frame member 111 of the machine below the table top 10. When the lever 105 is in engagement with the abutment 104, as shown in Figs. 10 and 2, spring 99 will be compressed or charged so that when one steps upon and depresses the treadle 108 to swing the lever 105 upwardly about its pivot 106, the lever disengages the abutment 104 and the charged spring 99 will move the rod 96 to the left as viewed in Fig. 2. This action by reason of the connecting link 112 (see Fig. 2) swivelly connected as at 113 to the block 101 will manipulate the valve designated generally 82 by reason of a connection to its cross-head 114 and the plungers 115 and 116 to cause oil to be pumped through the pipe 87 for forcing the piston to the right, as viewed in Figs. 1 and 2.

At the same time the rod 96 will cause the collar 117 on this rod to move to the left in Fig. 2 or to the right in Fig. 3 to a position so that the latch 118 pivoted as at 119 (see Fig. 3) on the bracket 120 which is fixed to the block 93 will drop back of the collar 117 to lock the rod against movement in the opposite direction. The spring 99 will now have expended its force and caused the parts to move from the position shown in Fig. 2 to the position shown in Fig. 1, and the valve 82 having been shifted, the piston in the cylinder 75 will commence movement to the right, as viewed in Figs. 1 and 2. Abutments 121, 122 formed by check nuts 121′ and 121″ or 122′ and 122″ are adjustably arranged upon the threaded portion 123 of the rod 95 and are in the path of movement of an arm 124 adjustably positioned as by means of set screw 125 on the piston rod 76. As this piston rod moves to the right it will engage the abutments 122 and commence to move rod 95 to charge the spring 100 by movement of this rod, while the arm 102 of the block 101 is prevented from movement by reason of the latch 118 (see Fig. 3). As this action occurs bracket 126 which is secured on rod 95 (see Figs. 2 and 3) and which carries pins 127 and 128 causes the pin 128 to engage the pin 129 on the catch 118 and lifts this pawl from back of the collar 117 and against the tension of spring 130 to permit the spring 100 which has been charged to move the block 101 and with it the rod 96 in the opposite direction to reverse the position of the valve 82 and cause oil to be pumped through the pipe 88 into the opposite end of the cylinder. As this occurs, the movement of the rod 96 will be sufficient to cause the pawl 131 to drop back of the collar 132 on the shaft 96 by reason of the pull of its spring 133, this pawl 131 having a pin 134 upstanding therefrom similar to the pin 129. The pumping action will now cause the piston and its piston rod 76 to be moved to the left as viewed in Figs. 1 and 2. The arm 124 (see Fig. 2) will after it has traveled a certain distance pick up the abutment 121 and commence to move the rod 95 toward the left, as shown in Figs. 1 and 2. The rod 96 will be prevented from such movement to the left by reason of the pawl 131 and therefore the block 101 will commence to charge or compress the spring 99 and this will continue until the pin 127 in the bracket 126 has picked up and lifted the pawl 131 by means of its pin 134, and were it not for the lever 105 having dropped back of the abutment 104 on the block 101 a reversing action would occur, but by reason of the lever 105 engaging the abutment 104 (see Fig. 10) the valve moves only to a neutral position, and instead of the oil entering the left hand end of the cylinder 75, the valve being in neutral, the oil will by-pass to the reservoir 83 leaving the spring 99 sufficiently charged so as to throw the valve to its opposite position when the treadle 108 is again stepped upon and depressed.

In order to control the speed of operation of this mechanism a gate valve 135 in the line from the pump to the control valve 82 may be regulated that the desired flow and speed of travel of the mechanism may be accomplished. In order that the throw of the bending and guide rolls 27 and 47 may be adjusted, the handle 72 may be turned to vary the position of the cam. If it is desired to make a sharper bending action the link 44 may be rotated by means of its squared end 45 that such adjustment may be accomplished, and a similar adjustment may be accomplished for the guide roll 47. The extent of the inward movement of the rolls before outward movement automatically commences may be governed by the positioning of the abutments 121 and 122 varying distances apart. Through these different adjustments varying diameter tubes or wire may be coiled in a generally hour-glass form, as shown in Fig. 12, after which the coils may be axially compressed so as to lie one within the other in the form of two spiral coils with their ends both on the outer circumference. This machine is of such an arrangement that it may be almost universal in its use and by its adjustment most any size wire or tube may be operated upon and most any size coil may be developed. It will of course be apparent that by leaving the treadle 108 depressed additional coiling to that shown in Fig. 12 will be had so that any number of layers after compression may be had automatically.

The operation of the several parts of the apparatus has been given in connection with the detailed description thereof and a brief general description of the operation of the apparatus as a whole will suffice to clearly understand its mode of operation. It will be assumed that the several parts of the apparatus are in proper relative position to produce a coil of material having the desired form and dimension, and that such parts as the feeding rolls and fluid pump have been set in motion by the necessary manipulation of the power source control. The material to be coiled, which should be of a length predetermined to be sufficient to form the required complete coil, is inserted between the feed rolls 11 and 12 and at the same instant the treadle 108 is depressed which causes the link 105 to be moved to release the block 101 and permit the precharged spring 99 to act thereon and move the block 101 to actuate the valve 82 that is operatively connected thereto by link 112 which causes the fluid under pressure to flow through the pipe 87 to enter the cylinder 75 and move the piston therein (not shown) and its connecting rod 76 to the right as viewed in Figs. 1 and 2. Fig. 1 substantially illustrates the relative position of the parts subsequent to the release of the block 101 from the locked position and of a partial travel of the piston rod and connected parts.

The movement of the piston causes a movement of the cam 67 in Fig. 1 operatively connected to the piston rod 76. The travel of this cam transmits motion to the cam roll 60 in contact therewith and through the connection 44 and 44′, operatively connected to the cam roll moves the bending and the guide rolls relative to the feeding rolls. This travel of the piston is also transmitted to the rod 95 through the connection 124 (see Fig. 2) and the abutment 122 which when moved sufficiently will compress or charge the spring 100 encircling this rod 95 and positioned between the abutment 98 and the block 101 fast to the rod 96, this block 101 being held against movement by the engagement of the abutment 117 thereon with the pivoted latch 118. After a sufficient travel of this rod 95, determined by the relative position of the spaced abutments 121′ and 122 secured thereon, the pin 128 carried on the arm of the bracket 126 will engage the pin 129 on the latch 118 and move this latch from engagement with the abutment 117 which will permit the now compressed or charged spring 100 to force the block 101 and the rod 96 toward the right a distance sufficient for the latch 131 (see Fig. 3) to drop back of the abutment 132 on the end of the rod 96 and lock the rod against opposite movement. At the end of the travel of rod 96 toward the right, the lever 105 is permitted to drop in position to be engaged by the abutment 104 on the block 101. The movement of the rod 96 toward the right will actuate the valve 82 to cause the fluid under pressure to enter the cylinder 75 at the right end thereof and reverse the direction of travel of the piston rod 76, and its associated parts.

The travel of the piston rod toward the right will cause the bending roll to move inwardly toward the feeding rolls at a predetermined ratio relative to the feed of the material through the bending mechanism, to bend the work on an arc of gradually decreasing radius. At the moment of the reversal of the direction of travel of the piston rod, the then last convolution of the work made will have an arc of minimum radius.

The travel of the piston rod in the opposite direction, or toward the left (Fig. 1) will cause the bending roll to be moved in an opposite direction by the spring 56 and the arc of convolutions of the material will increase correspondingly to the movement of the bending roll until the initial size of convolution is attained when the apparatus is brought to rest.

The travel of the piston rod toward the left (Fig. 2) will cause the rod 95 to move in a similar direction which will charge the spring 99 which abuts against the locked block 101. When the rod 95 has moved sufficiently toward the left, the pin 127 (Fig. 3) secured to the arm of the bracket 126 will engage the pin 134 on the latch 131 and move it out of engagement with the abutment 132. This unlatching will permit the block 101 to be moved to the left by the previously compressed spring 99. However, the lever 105 is spaced from but in position to be engaged by the abutment 104 to arrest movement of the block; the distance the block moves is only sufficient to permit the block 101 to be moved to actuate the valve to a neutral position, the spring 99 being sufficiently charged to move the block 101, upon its release from this neutral position, to actuate the valve for commencement of a new cycle of operations.

It will be understood that the different actions above described will take place in their proper and predetermined order according to the form and size of the work required.

The foregoing description is directed solely towards the construction illustrated, but we desire it to be understood that we reserve the privilege of resorting to all the mechanical changes to which the device is susceptible, the invention being defined and limited only by the terms of the appended claims.

We claim:

1. In a coiling apparatus, a pair of feed rolls, a bending roll movable relative to said feed rolls and positioned in advance of the feed rolls relative to the feeding of the work in the machine, and a plurality of means operable in a predetermined cycle of operation for moving the bending roll with reference to said feeding rolls to decrease the arc of the work coiled until a predetermined point is reached and then automatically increasing the arc of the work coiled.

2. In a coiling apparatus, a pair of feed rolls, a bending roll movable relative to said feed rolls and positioned in advance of the feed rolls relative to the feeding of the work in the machine, and a plurality of means operable in a predetermined cycle of operation for moving the bending roll with reference to said feeding rolls to decrease the arc of the work coiled until a predetermined point is reached, and then automatically increasing the arc of the work coiled until the original arc of bending is reached.

3. In a coiling apparatus, a pair of feed rolls, a bending roll movable relative to said feed rolls, and hydraulic means operable in a predetermined cycle of operation for moving the bending roll with reference to said feeding rolls to change the arc of the work coiled.

4. In a coiling apparatus, a pair of feed rolls, a bending roll movable relative to said feed rolls and positioned in advance of the feed rolls relative to the feeding of the work in the machine, and cam controlled means for moving the bending roll with reference to said feeding rolls to change the arc of the work coiled.

5. In a coiling apparatus, a pair of feed rolls, a bending roll movable relative to said feed rolls and positioned in advance of the feed rolls relative to the feeding of the work in the machine, cam controlled means for moving the bending roll with reference to said feeding rolls to change the arc of the work coiled, and means for adjusting said cam surface.

6. In a coiling apparatus, a pair of feed rolls, a bending roll movable relative to said feed rolls and positioned in advance of the feed rolls relative to the feeding of the work in the machine, means for moving the bending roll with reference to said feeding rolls to change the arc of the work coiled comprising a link carrying a follower, a cam engaging said follower for moving the link, and means for actuating said cam.

7. In a coiling apparatus, a pair of feed rolls, a bending roll movable relative to said feed rolls, means for moving the bending roll with reference to said feeding rolls to change the arc of the work coiled comprising a link carrying a follower, a cam engaging said follower for moving the link, and hydraulic means for automatically actuating said cam in two directions.

8. In a coiling apparatus, a pair of feed rolls, a bending roll movable relative to said feed rolls, means for moving the bending roll with reference to said feeding rolls to change the arc of the work coiled comprising a link carrying a follower, a cam engaging said follower for moving the link, and hydraulic means for automatically actuating said cam in a predetermined cycle of operation and then stop the same.

9. In a coiling apparatus, a pair of feed rolls, a bending roll movably mounted and positioned in advance of the feed rolls relative to the feeding of the work in the machine, power operated means operable in a predetermined cycle of operation for moving the bending roll with reference to said feed rolls, and means associated with said power operated means for varying the movement of the bending roll to change the arc of the work coiled.

10. A coiling apparatus comprising a pair of feed rolls, a bending roll movably mounted, and positioned to be engaged by the work prior to the engagement of the feed rolls with the work, power operated means operable in a predetermined cycle of operation for moving the bending roll with reference to said feed rolls and also at a predetermined ratio relative to the feed of the material past the bending roll, and means associated with said power operated means for varying the movement of the bending roll to change the arc of the work coiled.

11. A coiling apparatus comprising a pair of feed rolls, a bending roll movable relative to the feed rolls, said feed rolls and bending roll being positioned and arranged to determine the arc of the work being coiled, power operated means operable in a predetermined cycle of operation for moving the bending roll with reference to said feed rolls, and means associated with said power operated means for varying the movement of the bending roll to change the arc of the work coiled.

12. A coiling apparatus comprising a pair of feed rolls, a bending roll movable relative to said feed rolls and positioned to be engaged by the work to be bent prior to the engagement of the feed rolls with the work, cam controlled means for moving the bending roll with reference to said feed rolls to change the arc of the work coiled, and means for adjusting said cam surface.

13. A coiling apparatus comprising a pair of feed rolls, a bending roll movable relative to said feed rolls, power operated means for moving said bending roll in one direction with reference to said feed rolls and resilient means for returning said bending roll to initial position.

14. A coiling apparatus comprising a pair of feed rolls, a bending roll movable relative to said feed rolls, power operated means for moving the bending roll with reference to said feed rolls, and means for controlling said power operated means including a trigger operated mechanism.

15. A coiling apparatus comprising a movably mounted bending roll, a pair of feed rolls arranged to pull the work to be bent and coiled to said bending roll, power operated means for moving said bending roll relative to said feed rolls, and means for controlling said power means to vary the movement of said bending roll to increase or decrease the arc of the work coiled.

16. A coiling apparatus comprising a pair of feed rolls, a bending roll adjustably and movably mounted and associated with said feed rolls and arranged therewith to bend the work on an arc, means for adjusting the position of said bending roll relative to said feed rolls, means for moving said bending roll relative to the feed rolls during the feeding of the work through the apparatus and means for varying the movement of said bending roll to increase or decrease the arc of the work coiled.

RALPH R. TURNER.
FRANCIS W. SULLIVAN.